US012179374B2

(12) United States Patent
Rowlay et al.

(10) Patent No.: US 12,179,374 B2
(45) Date of Patent: Dec. 31, 2024

(54) PIVOTING RAMPED BLADE LOCK

(71) Applicant: Stanley Black & Decker, Inc., New Britain, CT (US)

(72) Inventors: Stephen Rowlay, Sheffield (GB); Ralf Strauss, Stanley, NC (US)

(73) Assignee: Stanley Black & Decker, Inc., New Britain, CT (US)

( * ) Notice: Subject to any disclaimer, the term of this patent is extended or adjusted under 35 U.S.C. 154(b) by 284 days.

(21) Appl. No.: 17/688,272

(22) Filed: Mar. 7, 2022

(65) Prior Publication Data

US 2022/0395991 A1 Dec. 15, 2022

Related U.S. Application Data

(60) Provisional application No. 63/209,921, filed on Jun. 11, 2021.

(51) Int. Cl.
*B26B 5/00* (2006.01)

(52) U.S. Cl.
CPC .................................... *B26B 5/003* (2013.01)

(58) Field of Classification Search
None
See application file for complete search history.

(56) References Cited

U.S. PATENT DOCUMENTS 5,878,501 A 3/1999 Owens et al.
6,354,007 B1 3/2002 Scarla
6,688,003 B2 2/2004 Scarla
6,915,577 B2 7/2005 Scala
8,978,254 B1 3/2015 White
10,046,466 B2 8/2018 Wang
2003/0019110 A1* 1/2003 Knoop ...................... B26B 1/10 30/337
2005/0055833 A1 3/2005 Scarla
2005/0138816 A1* 6/2005 Ping ........................ B26B 1/042 30/160
2005/0274024 A1 12/2005 Jinliang
2006/0117570 A1 6/2006 Pool
2008/0052913 A1 3/2008 Cheng
2022/0395991 A1* 12/2022 Rowlay .................. B26B 5/003

FOREIGN PATENT DOCUMENTS

CN 2685034 Y 3/2005
CN 2685035 Y 3/2005
CN 2685036 Y 3/2005
CN 2700065 Y 5/2005
CN 2797081 Y 7/2006

(Continued)

OTHER PUBLICATIONS

Extended EP Search Report, dated Aug. 9, 2022, in related EP Application No. 22165046.8-1105.

*Primary Examiner* — Hwei-Siu C Payer
(74) *Attorney, Agent, or Firm* — Gabriel A. Haboubi

(57) ABSTRACT

A knife includes a handle, a neck configured to hold a blade, and a lever configured to selectively release the blade from the neck. The lever is coupled to a blade lock arm configured to extend along a side of the blade. A ramped surface pushes the blade lock arm into the blade to press the blade against a side of the neck to clamp the blade to the side of the neck when the blade lock arm is in a blade locked position.

10 Claims, 3 Drawing Sheets

(56) References Cited

FOREIGN PATENT DOCUMENTS

| | | | | | |
|---|---|---|---|---|---|
| CN | 201224106 | Y | | 4/2009 | |
| CN | 207789014 | U | | 8/2018 | |
| CN | 113146686 | A | * | 7/2021 | ............... B26B 5/00 |
| EP | 1071546 | A1 | | 1/2001 | |
| EP | 2835235 | A1 | | 2/2015 | |
| EP | 3165337 | B1 | | 3/2020 | |
| GB | 1497069 | A | | 1/1978 | |
| WO | 9947314 | A1 | | 9/1999 | |
| WO | 0018549 | A1 | | 4/2000 | |

* cited by examiner

PIVOTING RAMPED BLADE LOCK

CROSS-REFERENCE TO RELATED APPLICATIONS

This application claims priority to U.S. Provisional Patent Application 63/209,921, filed on Jun. 11, 2021, and incorporated herein by reference in its entirety.

FIELD OF THE INVENTION

The present invention relates generally to tools, and more particularly to knives, such as knives having detachable or replaceable blades (e.g., utility knives). It may be appreciated that the teachings herein may be applicable to other tools with replaceable blades, including but not limited to files or saws, either as hand tools or power tools (e.g., reciprocating saws).

BACKGROUND OF THE INVENTION

While aspects of the disclosed invention may be applicable to a variety of tools, in some embodiments, including those illustrated, the tool may be a utility knife. Many utility knives are configured to receive blades that are commonly known in the art. In some such knives, the blades have a generally trapezoidal and generally symmetrical configuration having one or more mounting notches so as to be engaged by conventional utility knives, where the blade has a main body with the one or more mounting notches formed in a first linear edge and a cutting edge opposite the first linear edge, and the cutting edge being disposed on a longest edge of the trapezoid. Some utility knife blades are configured with detachable segments that can be snapped off, and may have a tang portion that is held by a knife, where the blade can be replaced once all blade segments have been detached or discarded.

Among other things, the present application relates to various improvements to the mechanism by which a blade is secured to a tool, such as a utility knife blade is secured to a utility knife.

SUMMARY OF THE INVENTION

According to an embodiment, a knife includes a handle, a neck configured to hold a blade, and a lever configured to selectively release the blade from the neck. The lever is coupled to a blade lock arm configured to extend along a side of the blade. A ramped surface pushes the blade lock arm into the blade to press the blade against a side of the neck to clamp the blade to the side of the neck when the blade lock arm is in a blade locked position.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of knives in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

Figure 1:
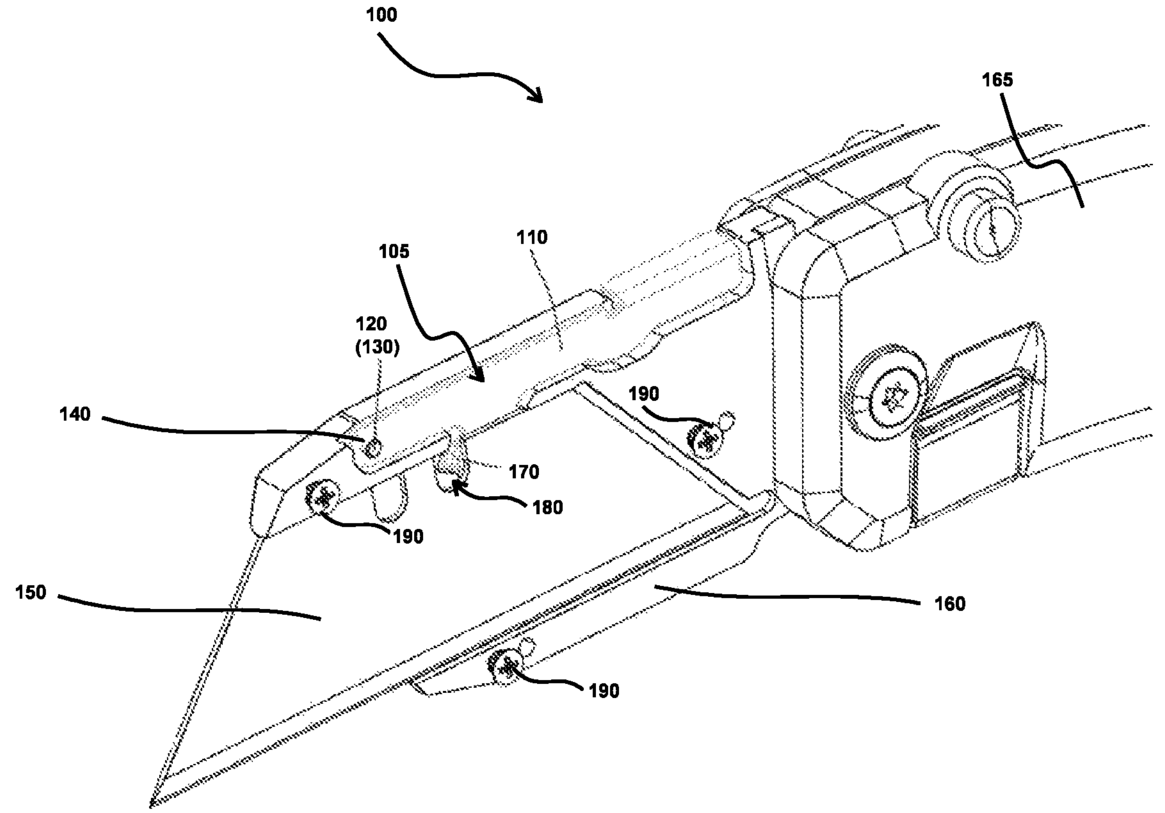
FIG. 1 illustrates a perspective view of a utility knife of the present disclosure, with a front portion of a blade holding neck omitted, showing engagement between a blade retention lever and a blade.

As shown in FIG. 1, a knife 100 includes a blade release mechanism 105 including a pivoting lever arm 110 that may rotate about an axis 120 (e.g., at an axial protrusion 130 such as a pivot pin received in an aperture 140 of the lever arm 110) to lock or unlock mounting a blade 150 to a blade holding neck 160 of the knife 100. While in the illustrated embodiment the neck 160 is foldable into a handle 165 of the knife 100, in other embodiments the neck 160 may integrally extend from or define a terminal end of the handle 165.

In some embodiments, the lever arm 110 is coupled to a blade notch engaging flange 170 such that when the lever arm 110 is pivoted into a blade locked position, such as that shown in FIG. 1, the blade notch engaging flange 170 pivots into a blade notch 180 of the blade 150. When the lever arm 110 is pivoted into a blade unlocked position, such as that shown in FIG. 2 discussed in greater detail below, the blade notch engaging flange 170 would be pivoted out of the blade notch 180, so that the blade 150 may be pulled forward out of the blade holding neck 160 (e.g., between the side illustrated and the side omitted from the illustrated view, which may be secured together by any appropriate mechanism, including but not limited to the threaded fasteners 190 shown).

Figure 2:
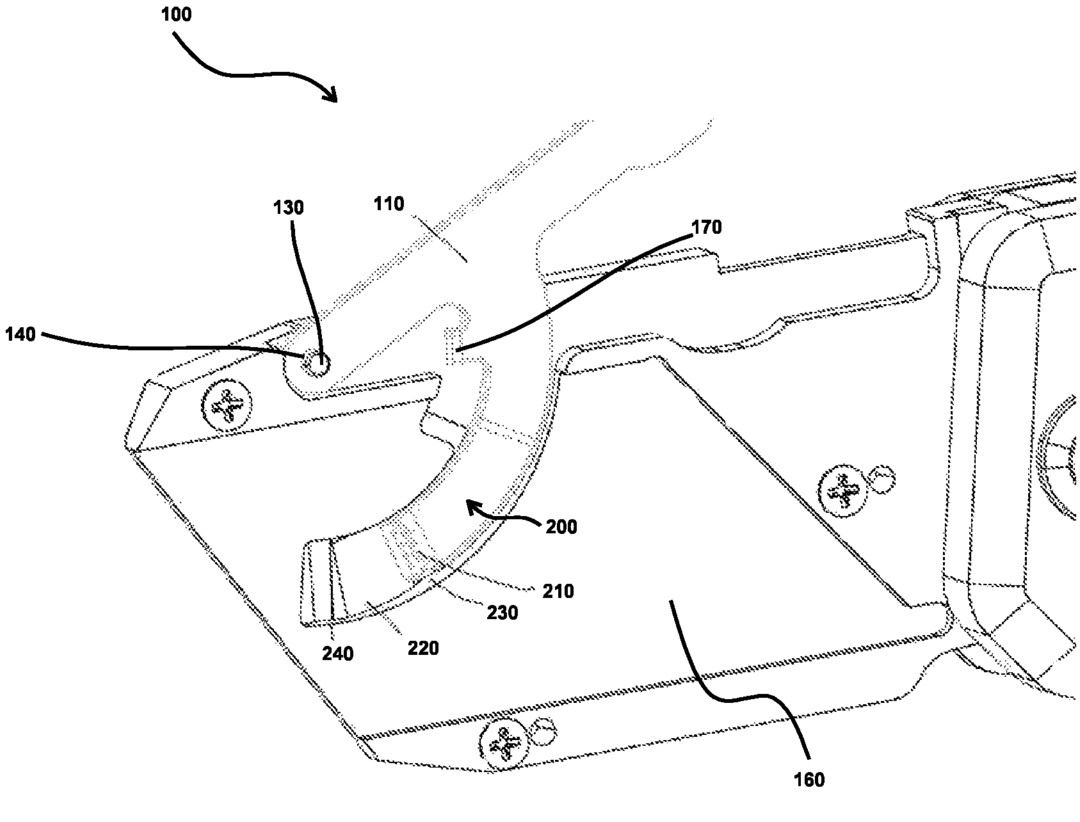
FIG. 2 illustrates an enlargement of the utility knife of FIG. 1, with the blade further omitted and the blade retention lever pivoted into a blade release position.

In some embodiments, the blade notch engaging flange 170 may be secondary to or omitted from other blade retention features coupled to the lever arm 110 that are configured to retain the blade 150 in the blade holding neck 160 of the knife 100. For example, as shown in FIG. 2, in an embodiment a blade lock arm 200 may extend from the lever arm 110, and may include a blade clamp end 210. A corresponding ramp 220 formed in the blade holding neck 160 may be shaped to correspond with the pivotal movement of the lever arm 110 and the blade lock arm 200, so that when the lever arm 110 is moved into the blade locked position, the ramp 220 closes a gap between the visible surface of the neck 160 and the opposing (omitted from view) side of the neck, pushing the blade clamp end 210 or other features of the blade lock arm 200 against the blade 150 to clamp the blade 150 into the neck 160 (e.g., with a clamp force between the blade clamp end 210 or other surfaces of the blade lock arm 200 and the omitted side of the neck 160). In an embodiment the blade lock arm 200 may deflect so as to provide a clamp force through the blade clamp end 210 onto the blade 150 and against the omitted side of the neck 160 while still allowing for tolerance variations, including but not limited to in one or more of the gap between the omitted side of the neck 160 and the visible side of the neck 160, in the forming of the ramp 220, or in the manufacture of the blade lock arm 200 or portions thereof.

It may be appreciated that the ramped structures may be switched in other embodiments, where a ramped surface shape may be formed on the blade lock arm 200 instead of an un-ramped depression formed in the neck 160. In some embodiments, both the ramp 220 and the blade lock arm 200 may include ramped configurations that cooperate to press the blade lock arm 200 against the blade 150 and clamp the blade 150 against the omitted from view side of the neck 160. It may further be appreciated that the position and/or structures of the blade release mechanism 105 may be mirrored in some embodiments from that visible in FIGS. 1-3, such that the ramp 220 is formed in the omitted side of the neck 160, and the blade release mechanism 105 including the blade lock arm 200 and associated structures are similarly connected to the omitted side of the neck from that shown in FIGS. 1-3, and as such engage an opposing face of the blade 150 (i.e., the visible face of the blade 150 shown in FIG. 1).

In some embodiments, the ramp 220 may include detents that receive a protrusion in the blade clamp end 210 (or other features of the blade lock arm 200), so as to provide a tactile feel to a user when the blade lock arm 200 is in one or both of the unlocked position or the locked position. For example, as shown in FIG. 2, when the lever arm 110 is in the open position allowing the blade 150 to be released from the neck 160, the blade clamp end 210 may be received in a first detent 230. As such, moving the lever arm 110 from the illustrated position would require moving or deforming the blade clamp end 210 to move the blade clamp end 210 out of the first detent 230. Similarly, when the lever arm 110 is being moved into or out of the locked position shown in FIG. 1, the movement would require moving or deforming the blade clamp end 210 to move the blade clamp end 210 out of the second detent 240.

Figure 3:
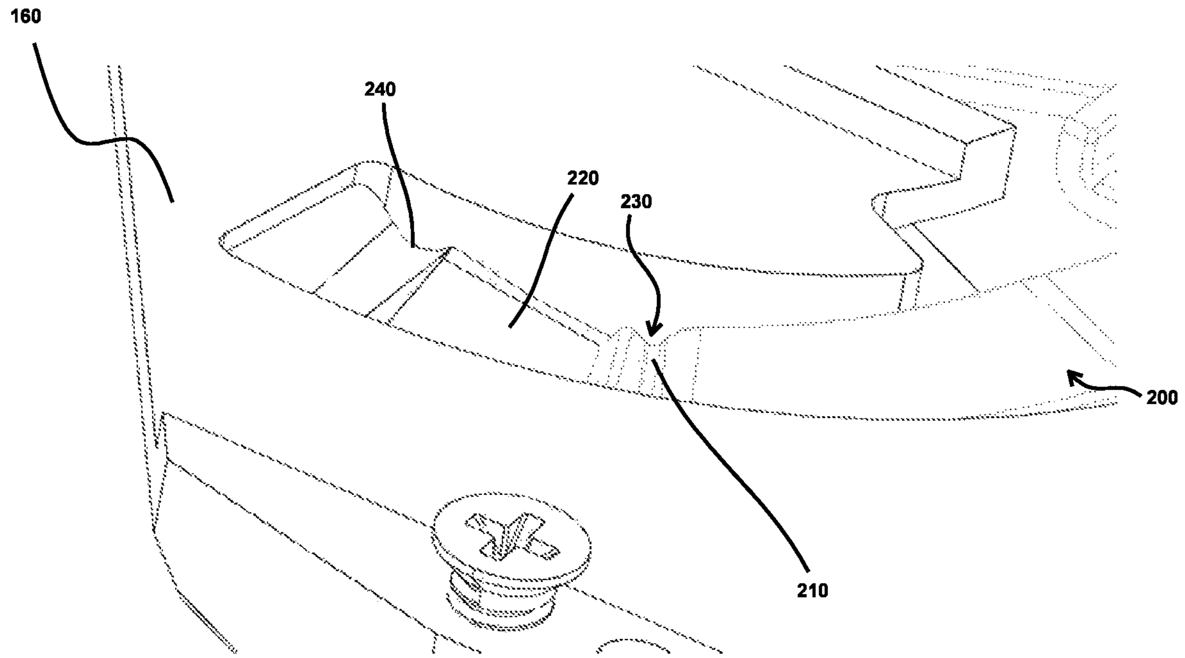
FIG. 3 illustrates a further enlargement and oblique perspective of the view of FIG. 2, to further show features therein.

FIG. 3 illustrates the view of FIG. 2 from an oblique angle, highlighting the incline of the ramp 220 relative to the detents and thickness of the blade clamp end 210, and a waved shape thereof in some embodiments that may facilitate rising up over a hump of the detents 230 and 240, when leaving the deeper recesses thereof.

In various embodiments, the knives and blades, and components thereof described herein may be formed of metal, plastic, ceramic, or any other appropriate material. It may be appreciated that the components described herein may be of different constructions or configurations, including but not limited to one or more being comprised of different material choices. For example, the components described herein may each be constructed from a variety of materials, including but not limited to one or more of fabrics, plastics, metals, rubbers, elastomers, or any other appropriate material choice. For example, in an embodiment one or more of the components (e.g., lever arm 110 or neck 160) may be formed of aluminum (e.g., machined aluminum), iron (e.g., steel), ceramic, or any other appropriate material. Similarly, portions of the knife 100 may be formed from molded plastic, metal, or combinations thereof (e.g., plastic with metal supports or fasteners coupling portions tougher). In some embodiments, structural and functional components may be formed from metal or hard plastic, while gripped components positioned to engage the palm of a gripping hand to provide the palm with a comfortable gripping surface may be made of a suitable molded plastic material or elastomeric material, and may be generally formed as a bi-material suitable molded plastic material coated with a layer of an elastomeric material, such as a rubber based material. In some embodiments, the material choices may differ from component to component. In various embodiments, some components may be integrally formed together, while other components may be assembled by any appropriate mechanism, including but not limited to fastened, welded, snap-fit, friction fit, adhesive bonding, or other appropriate securements.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A knife comprising:

a handle;

a neck connected to the handle and configured to hold a blade; and a lever configured to selectively release the blade from the neck;

wherein the lever is coupled to a blade lock arm configured to extend along a side of the blade;

wherein a ramped surface of the knife pushes the blade lock arm onto the blade to press the blade against a side of the neck to clamp the blade to the side of the neck when the blade lock arm is in a blade locked position.

2. The knife of claim 1, wherein the neck is pivotally mounted to the handle.

3. The knife of claim 1, wherein the ramped surface is formed on the neck.

4. The knife of claim 1, wherein the ramped surface comprises a detent configured to receive a protrusion of the knife to provide a tactile feel to a user when the blade lock arm is in the blade locked position.

5. The knife of claim 4, wherein the protrusion is formed on the blade lock arm, and the ramped surface is formed on the neck.

6. The knife of claim 1, wherein a detent of the knife is configured to provide a tactile feel to a user when the blade lock arm is in a blade unlocked position.

7. The knife of claim 6, wherein the detent is formed on the neck.

8. The knife of claim 1, wherein the lever is coupled to a blade notch engaging flange, and configured such that movement of the blade lock arm into the blade locked position moves the blade notch engaging flange into a blade notch of the blade.

9. The knife of claim 1, wherein the lever is pivoted at a pivot axis.

10. The knife of claim 9, wherein the neck comprises a pivot pin and the lever comprises a pivot aperture that receives the pivot pin.

* * * * *